United States Patent [19]

Thompson et al.

[11] Patent Number: 5,019,274
[45] Date of Patent: May 28, 1991

[54] METHODS FOR TREATING HYDROCARBON RECOVERY OPERATIONS AND INDUSTRIAL WATERS

[75] Inventors: Neil E. S. Thompson, Creve Coeur; Robert G. Asperger, Des Peres, both of Mo.

[73] Assignee: Petrolite Corporation, St. Louis, Mo.

[21] Appl. No.: 374,900

[22] Filed: Jun. 30, 1989

Related U.S. Application Data

[63] Continuation-in-part of Ser. No. 208,627, Jun. 20, 1988, Pat. No. 4,864,075, which is a continuation-in-part of Ser. No. 7,701, Jan. 28, 1987, abandoned, which is a continuation-in-part of Ser. No. 645,740, Aug. 30, 1984, abandoned.

[51] Int. Cl.$^5$ ............................................. C02F 1/54
[52] U.S. Cl. ...................................... 210/729; 209/5; 210/735
[58] Field of Search ............... 209/5; 210/708, 725, 210/727, 728, 729, 705, 735; 166/266, 267; 252/344, 348; 260/513.5; 558/237, 236

[56] References Cited

U.S. PATENT DOCUMENTS

| | | | |
|---|---|---|---|
| 1,788,632 | 1/1931 | Powers | 558/235 |
| 2,356,764 | 8/1944 | Kern | 558/237 |
| 3,364,108 | 1/1968 | Nakanishi et al. | 558/237 |
| 4,179,460 | 12/1979 | Georgiev et al. | 558/235 |
| 4,569,785 | 2/1986 | Bellos | 210/708 |
| 4,689,177 | 8/1987 | Thompson et al. | 252/344 |
| 4,855,060 | 8/1989 | Durham et al. | 210/729 |
| 4,864,075 | 9/1989 | Thompson et al. | 558/236 |

FOREIGN PATENT DOCUMENTS 0200143 12/1986 European Pat. Off. ............ 558/237

*Primary Examiner*—Peter Hruskoci
*Attorney, Agent, or Firm*—Stanley M. Tarter

[57] ABSTRACT

Certain dithiocarbamates are used as reverse demulsifiers, corrosion and scale inhibitors, flocculants, biocides, flotation aids, water clarifiers, interface control agents and antifoaming agents.

26 Claims, No Drawings

METHODS FOR TREATING HYDROCARBON RECOVERY OPERATIONS AND INDUSTRIAL WATERS

BACKGROUND OF THE INVENTION

Reference to Related Applications

This application is a continuation-in-part application of U.S. patent application Ser. No. 208,627, filed 1988 June 20, now U.S. Pat. No. 4,864,075 which is a continuation-in-part Application of U.S. patent application Ser. No. 007,701, filed 1987 Jan. 28, (now abandoned), which is a continuation-in-part Application of U.S. patent application Ser. No. 645,740, filed 1984 Aug. 30, (now abandoned).

FIELD OF THE INVENTION

This invention relates to multipurpose chemical compounds having utility in hydrocarbon, e.g., oil and gas, recovery, production transportation, storage and refining operations and in the treatment of industrial waters, i.e., water used in industrial processes.

In particular, the invention relates to nitrogen-containing dithiocarbamic acids and derivatives thereof having multiple uses.

PRIOR ART

In general, the preparation of nitrogen-containing dithiocarbamic acids and certain derivatives thereof is well known. Various types of such compounds have been disclosed as having utility as fungicides, biocides, film formers, vulcanization accelerators, extreme pressure agents for lubricants and corrosion inhibitors.

The following patents are considered pertinent to the present invention:

U.S. Pat. Nos. 2,326,643; 2,356,764; 2,400,934; 2,589,209; and 2,609,389 disclose reaction products of carbon disulfide with alkylene polyamines, the products being dithiocarbamic acids or their salts. U.S. Pat. Nos. 2,609,389 and 2,693,485 disclose the reaction products of lower alkylene diamines with carbon disulfide and the use of such reaction products, the products being further reacted with aldehydes to form condensation polymers. U.S. Pat. No. 2,400,934 discloses the reaction product of 1-diethyl-amino-4-aminopentane with carbon disulfide as an intermediate in a purification process. U.S. Pat. No. 2,326,643 discloses polydithiocarbamate reaction products of carbon disulfide with aliphatic polyamines and their use as intermediates in a subsequent reaction. U.S. Pat. No. 2,356,764 discloses monodithiocarbamate reaction products of alkylene diamines with carbon disulfide and the use of such products as film formers.

U.S. Pat. No. 2,561,208 discloses reaction products of carbon disulfide with diamines having cyclohexyl groups in their chain and their use in preparing in rubber vulcanization accelerators, bactericides and fungicides.

U.S. Pat. No. 2,733,262 discloses reaction products of carbon disulfide with N-(hydroxyalkyl) alkylene diamines, the reaction produces being bisdithiocarbamic acids having agricultral fungicidal activity.

U.S. Pat. No. 3,392,192 discloses inner salt reaction products of carbon disulfide with internally alkoxylated diamines, such products having utility as corrosion inhibitors and as extreme pressure agents for lubricants.

SUMMARY OF THE INVENTION

One aspect of the present invention pertains to the novel compositions and uses of certain dithiocarbamates in a variety of industrial applications, particularly in the treatment of liquids associated with hydrocarbon recovery, production, transportation, storage and refining operations and in the treatment of industrial waters.

Another aspect of the invention pertains to certain novel dithiocarbamates.

DESCRIPTION OF THE PREFERRED EMBODIMENTS

Compounds useful in accordance with the various aspects of the present invention may be characterized by one of the following formulas:

wherein R is a divalent, trivalent or tetravalent saturated hydrocarbon radical, preferably having 3–30 carbon atoms; n is an integer corresponding to the valence of R, $R_1$ is a $C_2$–$C_4$ alkylene; x is an integer of 1 to about 30; $R_2$ is an alkali metal, such as potassium, sodium and lithium, an alkaline earth metal, such as calcium, magnesium, etc., or $N(R_3)_4$ where $R_3$ is a lower alkyl such as $C_1$–$C_{10}$ alkyl;

wherein Ⓣ is hydrogen, $C(=S)SR_2$,

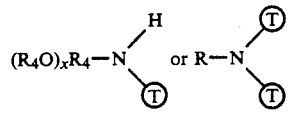

with the proviso that at least two Ⓣs are $C(=S)SR_2$; R is an alkylene having 2–30 carbon atoms, preferably 2–6 carbon atoms; $R_1$ is hydrogen or an alkyl having 1–30 carbon atoms; $R_2$ is an alkali metal, such as potassium, sodium, and lithium, an alkaline earth metal, such as calcium, magnesium, etc., or $N(R_3)_4$ where $R_3$ is a lower alkyl, such as $C_1$–$C_{10}$ alkyl; and n is an integer of 1–10, preferably 1–5; and $R_4$ is $C_2$–$C_4$ alkylene; x is an integer of 3–200, preferably 3–50;

wherein R is a divalent, trivalent or tetravalent saturated hydrocarbon radical, preferably having 3–30 carbon atoms; n is an integer corresponding to the valence of R; $R_2$ is an alkali metal, such as potassium, sodium and lithium, an alkaline earth metal, such as calcium, magnesium, etc., or $N(R_3)_4$ where $R_3$ is a lower alkyl, such as $C_1$–$C_{10}$ alkyl; and

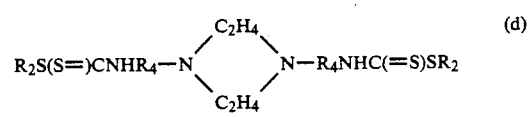

wherein $R_4$ is an alkylene having 2–30 carbon atoms, preferably 2–6, and $R_2$ is an alkali metal, such as potassium, sodium, and lithium, an alkaline earth metal, such as calcium, magnesium, etc., or $N(R_3)_4$ where $R_3$ is a lower alkyl, such as $C_1$-$C_{10}$ alkyl; and

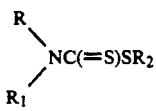 (e)

wherein R and $R_1$ are alkyls or cyclic hydrocarbons including aralkyl and alkylaryl, having 1-30 carbon atoms and $R_2$ is an alkali metal, such as potassium, sodium, and lithium, alkaline earth metal such as calcium, magnesium, etc., or $N(R_3)_4$ wherein $R_3$ is a lower alkyl, such as $C_1$-$C_{10}$ alkyl. Either R or $R_1$ can be hydrogen but not both can be hydrogen.

Representative primary and secondary amines which may be used to prepare the compounds described herein include methylamine, ethylamine, butylamine, hexylamine, octylamine, octadecylamine, dimethylamine, diethylamine, dibutylamine, dihexylamine, dioctylamine, ethylenediamine, propylene diamine, dipropylene triamine, triethylene tetramine, tripropylene tetramine, Tetrameen® 10 C commercially available from AKZO, triaminononane, tetraethylenepentamine, cyclohexylamine, dibenzylamine, bishexamethyleneTriamine, diethylenetriamine, Duomeen®EA-80 commercially available from AKZO, Jeffamine® T-403 commercially available from Texaco and other alkylamines, alkylene polyamines, polyalkylene polyamines and the like. In the preparation of compounds of herein, oxyalkylating agents which are reacted with the amine include ethylene oxide, propylene oxide, butylene oxide and the like and mixtures thereof.

The compounds of the invention have utility as reverse demulsifiers (demulsification of oil-in-water emulsions), corrosion and scale inhibitors, flocculants, biocides, flotation aids, water clarifiers, interface control agents and antifoamers.

The following examples are not to be considered as limiting the scope of the invention. They illustrate specific embodiments of the invention and the best mode of practice thereof.

PREPARATION OF COMPOUNDS

Example 1

Reaction

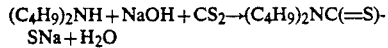

Reactants

| Dibutylamine: | 12.9 gms (0.1 m) |
| NaOH: | 4.0 gms (0.1 m) |
| $CS_2$: | 7.6 gms (0.1 m) |
| Total Water: | 71.0 gms (includes water in NaOH sol.) |

Procedure

In a 500 ml flask equipped with a magnetic stirrer, thermometer, dropping funnel and reflux condenser attached to a caustic scrubber were placed 8.0 grams of 50% NaOH, 67 grams water and 12.9 grams dibutylamine. This mixture was cooled externally in an ice bath to 10°-15° C. and then 7.6 grams carbon disulfide were added over a period of 10 minutes with vigorous stirring while maintaining the reaction temperature below 15° C. After an additional 10 minutes the ice bath was removed and the reaction mixture allowed to warm up to room temperature (25° C) and stirring continued for 1 hour. Before transferring the final product, the reactor was purged with nitrogen/air to remove any residual $CS_2$ or $H_2S$ which might have been produced during the preparation.

In the same manner, similar products are prepared using other mono- and di-amines, e.g., ethylamine, propylamine, butylamine, cyclohexylamine, dibenzylamine and the like.

Example 2

Reaction

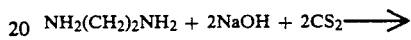

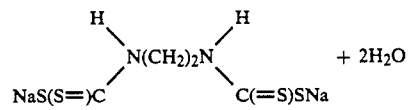

Reactants

| Ethylenediamine: | 6.0 gms (0.1 m) |
| NaOH: | 8.0 gms (0.2 m) |
| $CS_2$: | 15.2 gms (0.2 m) |
| Total Water: | 29.2 gms |

Procedure

As in Example 1.

Example 3

Reaction

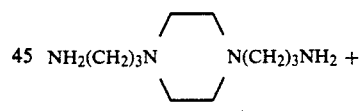

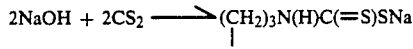

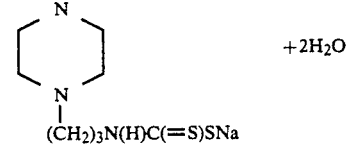

Reactants

| Tetrameen 10 C: | 20.0 gms (0.1 m) |
| NaOH: | 8.0 gms (0.2 m) |
| $CS_2$: | 15.2 gms (0.2 m) |
| Total Water: | 43.2 gms |

Procedure

As in Example 1.

Example 4

Reaction

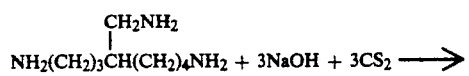
$NH_2(CH_2)_3CH(CH_2)_4NH_2 + 3NaOH + 3CS_2 \longrightarrow$

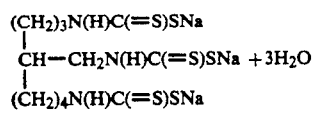
$+ 3H_2O$

Reactants

| Triaminononane: | 48.4 gms (0.28 m) |
|---|---|
| NaOH: | 34.0 gms (0.84 m) |
| $CS_2$: | 64.0 gms (0.84 m) |
| Total Water: | 152.0 gms |

Procedure

As in Example 1.

Example 5

Reaction $NH_2(CH_2)_2NH(CH_2)_2NH(CH_2)_2NH(CH_2)_2NH_2 +$ $5NaOH + 5CS_2 \longrightarrow$ 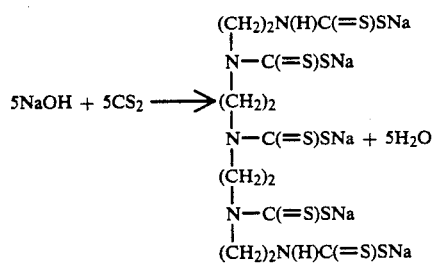 $+ 5H_2O$ Reactant

| Tetraethylenepentamine (TEPA): | 18.9 gms (0.1 m) |
|---|---|
| NaOH: | 20.0 gms (0.5 m) |
| $CS_2$: | 38.0 gms (0.5 m) |
| Total Water: | 76.9 gms |

Procedure

As in Example 1.

Example 6

Reaction $NH_2(CH_2)_6NH(CH_2)_6NH_2 + 3NaOH + 3CS_2 \longrightarrow$

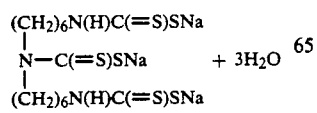 $+ 3H_2O$

Reactants:

| Bishexamethylenetriamine (BHMT): | 21.5 gms |
|---|---|
| NaOH: | 12.0 gms (0.3 m) |
| $CS_2$: | 22.8 gms (0.3 m) |
| Total Water: | 65.0 gms |

Procedure

As in Example 1.

Example 7

Reaction $NH_2(CH_2)_2NH(CH_2)_2NH_2 + 3NaOH + 3CS_2 \longrightarrow$

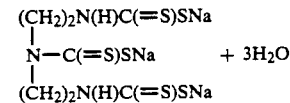 $+ 3H_2O$

Reactants

| Diethylenetriamine (DETA): | 10.3 gms (0.1 m) |
|---|---|
| NaOH: | 12.0 gms (0.3 m) |
| $CS_2$: | 22.8 gms (0.3 m) |
| Total Water: | 45.1 gms |

Procedure

As in Example 1.

Example 8

Reaction $CH_3(CH_2)_7NH(CH_2)_3NH_2 + 2NaOH + 2CS_2 \longrightarrow$

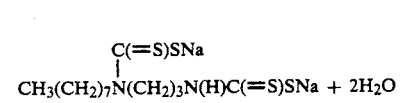 $+ 2H_2O$

Reactants

| Duomeen EA-80: | 18.6 gms (0.1 m) |
|---|---|
| NaOH: | 8.0 gms (0.2 m) |
| $CS_2$: | 15.2 gms (0.2 m) |
| Total Water: | 50.4 gms |

Procedure

As in Example 1.

Example 9

Reaction

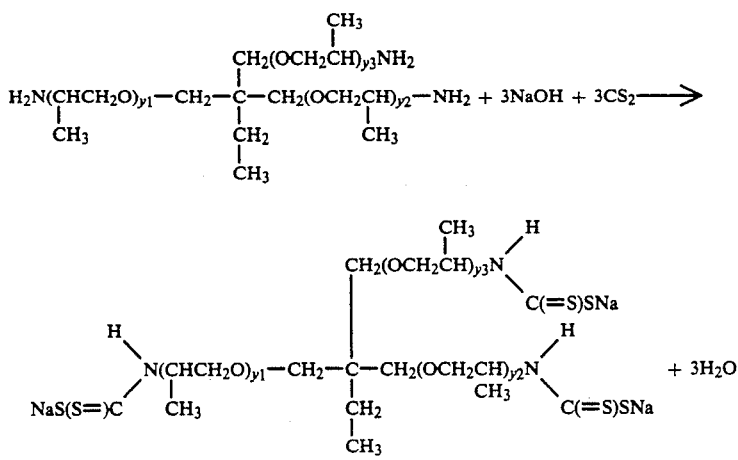

$y_1 + y_2 + y_3 = 5.6$ avg.

Reactants

| Jeffamine T-403: | 95.7 gms (0.21 m) |
| --- | --- |
| $CS_2$: | 45.6 gms (0.60 m) |
| NaOH: | 24.0 gms (0.60 m) |
| Total Water: | 155 gms |

Procedure

As in Example 1.

Example 10

Reaction $H_2N(CH_2)_2N(CH_2)_2NH_2 + 3NaOH + 3CS_2 \longrightarrow$
$\phantom{H_2N(CH_2)_2N}|$
$\phantom{H_2N(CH_2)_2}(CH_2)_2NH_2$

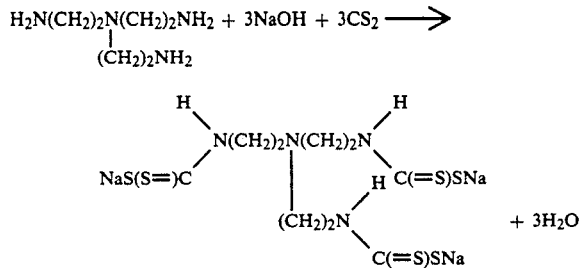

Reactants

| Trisaminoethylamine: | 31.0 gms (0.21 m) |
| --- | --- |
| $CS_2$: | 45.6 gms (0.6 m) |
| NaOH: | 24.0 gms (0.6 m) |
| Total Water: | 101.0 gms |

Procedure

As in Example 1.

BREAKING EMULSIONS OF THE OIL-IN-WATER CLASS

This aspect of the present invention relates to a process for resolving or separating emulsions of the oil-in-water class, i.e., so-called reverse emulsions, by subjecting the emulsion to the action of the compounds of this invention.

Emulsions of the oil-in-water class comprise organic oily materials, which, although immiscible with water or aqueous or non-oily media, are distributed or dispersed as small drops throughout a continuous body of non-oily medium. The proportion of dispersed oily material is in many, and possibly most, cases a minor one.

Oilfield emulsions containing small proportions of crude petroleum oil relatively stably dispersed in water or brine are representative oil-in-water emulsions. Other oil-in-water emulsions include steam cylinder emulsions, in which traces of lubricating oil are found dispersed in condensed steam from steam engines and steam pumps, wax-hexane-water emulsions encountered in de-waxing operations in oil refining, butadiene tar-in-water emulsions formed in the manufacture of butadiene from heavy naphtha by cracking in gas generators and occurring particularly in the wash box waters of such systems, emulsions of "flux oil" in steam condensate produced in the catalytic dehydrogenation of butylene to produce butadiene, styrene-in-water emulsions in synthetic rubber plants, synthetic latex-in-water emulsions formed in plants producing copolymer butadiene-styrene or GR-S synthetic rubber, oil-in-water emulsions occurring in the cooling water systems of gasoline absorption plants, pipe press emulsions from steam-actuated presses in clay pipe manufacture, emulsions or petroleum residues in diethylene glycol formed in the dehydration to natural gas.

In other industries and arts, emulsions of oily materials in water or other non-oily media are encountered, for example, in synthetic resin emulsion paint formulation, milk and mayonnaise processing, marine ballast water disposal and furniture polish formulation. In cleaning the equipment used in processing such products, diluted oil-in-water emulsions are inadvertently, incidentally or accidentally produced. The disposal of aqueous wastes is, in general, hampered by the presence of oil-in-water emulsions. Steam distillation and other production procedures sometimes cause oil-in-water emulsions to be produced, from which the essential oils are difficultly recoverable.

Essential oils comprise non-saponifiable materials like terpenes, lactones and alcohols. They also contain saponifiable esters or mixtures of saponifiable and non-saponifiable materials.

In all such examples, a non-aqueous or oily material is emulsified in an aqueous or non-oily material with which it is naturally immiscible. The term "oil" is used herein to cover broadly the water-immiscible materials present as dispersed particles in such systems. The non-oily phase obviously includes diethylene glycol, aqueous solutions and other non-oily media, in addition to water itself.

Oil-in-water emulsions contain widely differing proportions of dispersed phase. Where the emulsion is a waste product resulting from a flushing with water of manufacturing areas or equipment, the oil content may be only a few parts per million. Resin emulsion paints contain a major proportion of dispersed phase. Naturally occurring oil field emulsions of the oil-in-water class carry crude oil in proportions varying from a few parts per million to about 20%, or even higher in rare cases.

This aspect of the present invention is concerned with the resolution of these emulsions of the oil-in-water class which contain a minor proportion of dispersed phase, i.e., ranging from 20% down to a few parts per million.

Although the present invention relates to emulsions containing as much as 20% dispersed oily material, many of them contain appreciably less than this amount of dispersed phase. In fact, most of the emulsions encountered in the development of this invention have contained about 1% or less of dispersed phase. It is to such oil-in-water emulsions having dispersed phase volumes of the order of 1% or less to which the present process is particularly directed. This does not mean that any sharp line of demarcation exists, and that, for example, an emulsion containing 1% of dispersed phase will respond to the process, whereas one containing 1.1% of the same dispersed phase will remain unaffected. In general, however, dispersed phase proportions of the order of 1% or less appear most favorable for application of the present process.

In emulsions having high proportions of dispersed phase, appreciable amounts of some emulsifying agent are probably present, thus accounting for their stability, In the case of more dilute emulsions, containing 1% or less of dispersed phase, there may be difficulty in accounting for their stability on the basis of the presence of an emulsifying agent in the conventional sense. For example, steam condensate frequently contains very small proportions of refined petroleum lubricating oil in extremely stable dispersion, yet neither the steam condensate nor the refined hydrocarbon oil would appear to contain anything suitable to stabilize the emulsion. In such cases, emulsion stability must probably be predicated on some basis other than the presence of an emulsifying agent.

The present process, as stated above, appears to be effective in resolving emulsions containing up to about 20% of dispersed phase. It is particularly effective on emulsions containing not more than about 1% of dispersed phase, which emulsions are the most important, in view of their common occurrence.

The process which constitutes for present invention comprises subjecting an emulsion of the oil-in-water class to the action of a compound of the kind herein described, thereby causing the oil particles in the emulsion to coalesce sufficiently to rise to the surface of the non-oil layer (or settle to the bottom, if the oil density is greater), when the mixture is allowed to stand in the quiescent state after treatment with the compound.

In operating the present process to resolve an oil-in-water emulsion, a compound of the invention is in&introduced at any convenient point in the system and it is mixed with the emulsion in any desired manner, such as by being pumped or circulated through the system or by mechanical agitation, such as by paddles or by gas agitation. After mixing, the mixture of emulsion and added compound is allowed to stand quiescent until the constituent phases of the emulsion separate. Settling times and optimum mixing times will, of course, vary with the nature of the emulsions and the apparatus available. The operation, in its broadest concept, is simply the introduction of a compound of the invention into the emulsion, the mixing of the two to establish contact and promote coalescence, and, usually, the subsequent quiescent settling of the agitated mixture to produce the aqueous and non-aqueous emulsion phases as stratified layers.

Agitation may be achieved in various ways. The piping system through which the emulsion is passed during processing may itself supply sufficient turbulence to achieve adequate mixing of reagent and emulsion. Baffled pipe may be inserted to provide agitation. Other devices such as perforated chamber mixers, excelsior- or mineral- or gravel- or steel shaving-packed tanks or beds or stones or gravel or minerals in open ducts or trenches may be employed beneficially to provide mixing. The introduction of a gas, such as natural gas or air, into a tank or pipe in which or through which the mixture of compound and emulsion is standing or passing is frequently found suitable to provide desired agitation.

It has been found that the compound feed rate, agitation and settling time are somewhat inter-related. For example, with sufficient agitation of proper intensity the settling time required can be materially shortened. On the other hand, if agitation is not available but extended settling time is, the process may be equally productive of satisfactory results. The compound feed rate has an optimum range which is sufficiently wide to meet the tolerances required for the variances encountered daily in commercial operations.

The details of the mechanical structure's required to produce aeration suitable for the present purpose need not be given here. It is sufficient to state that any means capable of producing small gas bubbles within the body of the emulsion is acceptable for use.

The order in which the compound and the aeration step are applied is relatively immaterial. Sometimes it is more convenient to treat the emulsion with the compound and subsequently to apply the aeration technique. In others, it may be more advantageous to produce a strongly frothing emulsion and then introduce the compound into such aerated emulsion.

Any desired gas can be substituted for air in an aeration step. Other commonly suitable gases include natural gas, nitrogen, carbon dioxide, oxygen and the like, the gas being used essentially for its lifting effect. If any gas has some deleterious effect on any component of the emulsion, it will obviously be desirable to use, instead, some other gas which is inert under the conditions of use.

The compounds of the invention may be employed alone, or as mixtures, or they may be some instances be employed to advantage admixed with other compatible oil-in-water demulsifiers.

The process is commonly practiced simply by introducing small proportions of the compound into an oil-in-water emulsion, agitating to secure distribution of the compound and incipient coalescence and letting the mixture stand until the oil phase separates. The proportion of compound required will vary with the character of the emulsion to be resolved. Ordinarily, proportions of compound required are from amount 1 ppm to about 3000 ppm based on the volume of emulsion treated, but more or less may be required in specific instances. Preferably from about 10 ppm to 1000 ppm is employed, especially about 10 ppm to about 100 ppm.

A preferred method of practicing the process to resolve a petroleum oil-in-water emulsion is as follows: Flow the oil well fluids, consisting of free oil, oil-in-water emulsion and natural gas, through a conventional gas separator, &:hen to a conventional steel oil field tank, of, for example, 5,000 bbl. capacity. In this tank the oil-in-water emulsion falls to the bottom, is withdrawn, and is so separated from the free oil. The oil-in-water emulsion, so withdrawn, is subjected &:o the action of a compound of the invention in the desired small proportion, injection of the compound into the stream of oil-in-water emulsion being accomplished by means of a conventional proportioning pump or chemical feeder. The proportion employed, in any instance, is determined by trial and error. The mixture of emulsion and compound then flows to a pond or sump wherein it remains quiescent and the previously emulsified oil separates, rises to the surface and is removed. The separated water, containing relatively little to substantially none of the previously emulsified oil, is thereafter discarded or recycled.

All of the compounds disclosed and described herein have utility as reverse demulsifiers. Preferably, however, compounds of Formulas A–C are so used since they display the greatest effectiveness as reverse demulsifiers.

Example 11

Various compounds of the invention were subjected to bottle testing to determine effectiveness of the compounds as reverse demulsifiers. The products were tested in the following fashion:

Test water (100 ml. of oil field water containing an o/w emulsion of produced water and oil) was placed in 150 ml test bottles. An amount of chemical was added to each bottle and the bottles were agitated by hand or machine shaking for 100 shakes. The bottles are then observed. The object cf the test is to determine how fast the emulsion breaks and &he cleanness of the separated water. The results are set forth in the following table:

TABLE 1

| Product | Concentration (ppm) | Break Time | Comments |
| --- | --- | --- | --- |
| Example 6 | 30 | 30 sec. | Sparkling clear water |
| Example 8 | 30 | 30 sec. | Sparkling clear water |
| Example 9 | 40 | 30 sec. | Sparkling clear water |

The tests indicate that all of the compounds tested are effective as reverse demulsifiers.

Example 12

The compound of Example 9 was subjected to an additional bottle test and was found to provide sparkling clear water with minimum agitation (50 shakes) at concentrations of 5–50 ppm with oil carryover of 30 ppm at 5 ppm chemical usage and 10 ppm at 30 ppm chemical usage.

Example 13

The compound of Example 9 was field tested at a producing oil well site in Michigan. It was determined that the compound quickly broke a very tight o/w emulsion and reduced the oil levels of injection water from about 280 ppm (as determined by Wilks IR analyzer) to levels as low as 20 ppm.

USE AS CORROSION INHIBITOR

This aspect of the present invention relates to the use of the compounds of the invention in inhibiting the corrosion of metals, most particularly iron, steel and ferrous alloys. The compounds can be used in a wide variety of applications and systems where iron, steel and ferrous alloys are affected by corrosion. They may be employed for inhibiting corrosion in processes which require a protective or passivating coating, as by dissolution in the medium which comes in contact with the metal. They can be used in preventing atmospheric corrosion, underwater corrosion, corrosion in steam and hot water systems, corrosion in chemical industries, underground corrosion and the like.

The corrosion inhibitors contemplated herein find special utility in the prevention of corrosion of pipe or equipment which is in contact with a corrosive oil-containing medium, as, for example, in oil wells producing corrosive oil or oil-brine mixtures, in refineries and the like. These inhibitors may, however, be used in other systems or applications. They appear to possess properties which impart to metals resistance to attack by a variety of corrosive agents, such as brines, weak inorganic acids, organic acids, $CO_2$, $H_2S$ and the like.

The method of applying the compounds is relatively simple in principle. The corrosion preventive compound is dissolved in the liquid corrosive medium in small amounts and is thus kept in contact with the metal surface to be protected. Alternatively, the corrosion inhibitor may be applied first to the metal surface either as is, or as a solution in some carrier liquid or paste. Continuous application, as in solution, is &he preferred method.

A process using the compounds of the invention finds particular utility in the protection of metal equipment of oil and gas wells, especially those containing or producing an acidic constituent such as $H_2S$, $CO_2$, organic acids and the like. For the protection of such wells, the compound, either undiluted or dissolved in a suitable solvent, is fed down the annulus of the well between the casing and producing tubing where it becomes commingled with the fluid in the well and is pumped or flowed from the well with these fluids, thus contacting the inner wall of the casing, the outer and inner wall of tubing, and the inner surface of all wellhead fittings, connections and flow lines handling the corrosive fluid.

Where the inhibitor compound is a liquid, it is conventionally fed into the well annulus by means of a motor driven chemical injector pump, or it may be dumped periodically (e.g., once every day or two) into the annulus by means of a so-called "boll weevil" device or similar arrangement. Where the inhibitor compound is in solid form, it may be dropped into the well as a solid lump or stick, it may be blown in as a powder with gas, or it may be washed in with a small stream of the well fluids or other liquid. Where there is gas pressure on the casing it is necessary, of course, to employ any of these treating methods through a pressure equalizing chamber equipped to allow introduction of reagent into the chamber, equalization of pressure between chamber and casing and travel of reagent from chamber to well casing.

Occasionally, oil and gas wells are completed in such a manner that there is no opening between the annulus and the bottom of the tubing or pump. This results, for example, when the tubing is surrounded at some point by a packing held by the casing or earth formation below the casing. In such wells the compounds may be introduced into the tubing through a pressure equalizing vessel, after stopping the flow of fluids. After being so treated, the well should be left closed in for a period of time sufficient to permit the compound to drop to the bottom of the well.

For injection into the well annulus, the corrosion inhibitor is usually employed as a solution in a suitable solvent. The selection of solvent will depend upon the specific compound being used and its solubility characteristics.

For treating wells with packed-off tubing, the use of solid "sticks" or plugs of a composition containing the inhibitor is especially convenient. These may be prepared by blending the inhibitor with a mineral wax, asphalt or resin in a proportion sufficient to give a moderately hard and high-melting solid which can be handled and fed into the well conveniently.

The protective action of the herein-described compounds appears to be maintained for an appreciable time after treatment ceases, but eventually is lost unless another application is made.

For the protection of gas wells and gas-condensate wells, the amount of corrosion inhibitor required will be within the range of one-half to 3 lbs. per million cubic feet of gas produced, depending upon the amounts and composition of corrosive agents in the gas and the amount of liquid hydrocarbon and water produced. However, in no case does the amount of inhibitor required appear to be stoichiometrically related to the amount of acids produced by a well, since protection is obtained with much less corrosion inhibitor than usually would be required for neutralization of the acids produced.

The compounds are particularly effective in the prevention of corrosion in systems containing a corrosive aqueous medium, and most particularly in systems containing brines.

The compounds can also be used in the prevention of corrosion in the secondary recovery of petroleum by water flooding and in the disposal of waste water and brine from oil and gas wells. Still more particularly, they can be used in a process of preventing corrosion in water flooding and in the disposal of waste water and brine from oil and gas wells, which is characterized by injecting them into an underground formation as an aqueous solution containing minor but effective amounts of the compounds of this invention to prevent the corrosion of metals employed in such operation.

When an oil well ceases to flow by the natural pressure in the formation and/or substantial quantities of oil can no longer be obtained by the usual pumping methods, various processes are sometimes used for the treatment of the oil-bearing formation in order to increase the flow of oil. These processes are usually described as secondary recovery processes. One such process which is used quite frequently is the water flooding process wherein water is pumped under pressure into what is called an "injection well" and oil, along with quantities of water, that has been displaced from the formation is pumped out of an adjacent well usually referred to as a "producing well". The oil which is pumped from the producing well is then separated from the water that has been pumped from the producing well and the water is pumped to a storage reservoir from which it can again be pumped into the injection well. Supplementary water from other sources may also be used in conjunction with the produced water. When the storage reservoir is open to the atmosphere and the oil is subject to aeration, this type of water flooding system is referred to herein as an "open water flooding system". If the water is recirculated in a closed system without substantial aeration, the secondary recovery method is referred to therein as a "closed water flooding system".

Because of the corrosive nature of oil field brines it is necessary to prevent or reduce corrosion, since corrosion increases the cost by making it necessary to repair and replace such equipment at frequent intervals.

Use of the compounds of the invention protects from corrosion metallic equipment employed in secondary oil recovery by water flooding, such as injection wells, transmission lines, filters, meters, storage tanks and other metallic implements employed therein and particularly those containing iron, steel and ferrous alloys.

In many oil fields, large volumes of water are produced and must be disposed of where water flooding operations are not in use or where water flooding operations cannot handle the amount of produced water. Most states have laws restricting pollution of streams and land with produced waters, and oil producers must then find some method of disposing of the waste-produced salt water. In many instances therefore, the salt water is disposed of by injecting the water into permeable low, pressure strata below the fresh water level. The formation into which the water is injected is not the oil producing formation and this type of disposal is defined as salt water disposal or waste water disposal. The problems of corrosion of equipment are analogous to those encountered in the secondary recovery operation by water flooding.

The compounds of this invention can also be used in such water disposal wells, thus providing a simple and economical method of solving the corrosion problems encountered in disposing of unwanted water.

Water flood and waste disposal operations are too well known to require further elaboration. In essence, in accordance with the present invention, the flooding operation is effected in the conventional manner, except that the flooding medium contains a minor amount of the compounds of the invention, sufficient to prevent corrosion.

While the flooding medium employed in accordance with the present invention contains water or oil field brine and the compounds of this invention, the medium may also contain other materials. For example, the flooding medium may also contain other agents such as surface active agents or detergents which aid in wetting and also promote the desorption of residual oil from the formation, sequestering agents which prevent the deposition of calcium and/or magnesium compounds in the interstices of the formation, bactericides which prevent the formation from becoming plugged through bacterial growth, tracers and the like.

The use concentration of the corrosion inhibitors of this invention will vary widely depending on the specific compound used, its formulation with other materials, the particular system and the like. Concentrations of at least about 5 ppm, such as about 10 to about 10,000 ppm, for example, about 25 to about 5,000 ppm, advantageously about 25 to about 1,000 ppm, preferably about 25 to about 250 ppm may be employed. Larger amounts can also be employed. For example, since the success of a water flooding operation manifestly depends upon its total cost being less than the value of the additional oil recovered from the oil reservoir, it is quite important to use as little as possible of these compounds consistent with optimum corrosion inhibition. Since the compounds are themselves inexpensive and are used in low concentrations, they enhance the success of a flood operation by lowering the cost thereof.

By varying the constituents of the composition containing the compounds of the invention, the compounds can be made more oil or more water soluble, dependinq on whether the composition is to be employed in oil or water systems.

Example 14

TEST FOR "SWEET" CORROSIVE SYSTEMS

CO₂ Brine Sparge Test

The $CO_2$ brine sparge test is a reliable, quick test to screen compounds as corrosion inhibitors in "sweet" corrosive systems. A laboratory brine solution is sparged with stirring with 99.9% grade $CO_2$ for about one hour before immersing cleaned and weighed corrosion coupons. A M-1010 PAIR ® meter was used to monitor the corrosion rate of each test cell. After one to two hours the corrosion rate reached a "steady state", but a precorrosion period of 3.5 hours was used for consistency before the test inhibitor was added. The precorroding period in the inhibited brine solution is very important. This provides a precorroded test surface thereby minimizing surface preparation variations and also provides at least a minimal corrosion product layer without inhibitor in it against which the test inhibitor must work. This step is important, because in the equipment, the inhibitor is only rarely used from day one and then it is used on rusted steel and not freshly sand-blasted surfaces.

The inhibitors were injected below the brine surface at 50 ppm based on the active component. The 24 hour test period was monitored with a M-1010 PAIR meter as a "bark-up", but the corrosion rates and percent protection were determined by weight loss measurements.

Examples of sweet corrosive systems include carbon dioxide-containing gas systems such as sweet gas lines, sweet gas wells and similar systems.

The test results are summarized in the following table:

TABLE 2

| Product of Example | Percent Protection |
| --- | --- |
| 1 | 92 |
| 2 | 85 |
| 3 | 96 |
| 4 | 99 |
| 5 | 97 |
| 6 | 96 |
| 7 | 92 |
| 8 | 96 |

TABLE 2-continued

| Product of Example | Percent Protection |
| --- | --- |
| 9 | 99 |

The results clearly demonstrate the effectiveness of the compounds of the invention as corrosion inhibitors. These compounds also have the following very important properties:

(1) They have excellent stability in fresh water and high brines.
(2) They are non-emulsifying.
(3) They show extremely rapid corrosion inhibition.

USE AS SCALE INHIBITORS

This aspect of the invention relates to the use of the components of the invention in inhibiting scale formation in a wide variety of applications and systems.

Scale formation, from aqueous solutions containing an oxide variety of scale-forming compounds, such as calcium, barium and magnesium carbonates, sulfates, silicates, oxalates, phosphates, hydroxides, fluorides and the like, is inhibited by the use of threshold amounts of the compounds of the invention, such as less than 2.5 ppm.

The scale inhibitors of the present invention illustrate improved inhibiting effect at high temperatures when compared to prior art compounds. The compounds of the present invention will inhibit the deposition of scale-forming alkaline earth metal compounds on a surface in contact with an aqueous solution of the alkaline earth metal compounds over a wide temperature range. Generally, the temperatures of the aqueous solution will be at least 45° C. although significantly lower temperatures will often be encountered. The preferred temperature range for inhibition of scale deposition is from about 34° C. to 175° C. The aqueous solutions or brines requiring treatment generally contain about 50 ppm to about 50,000 ppm of scale-forming salts. The compounds of the present invention effectively inhibit scale formation when present in an amount of from about 0.1 to about 100 ppm, preferably from about 0.2 to about 50 ppm, wherein the amounts of the inhibitor are based upon the total aqueous system. There does not appear to be a concentration below which the compounds of the present invention are totally ineffective. A very small amount of the scale inhibitor is effective to a correspondingly limited degree, and the threshold effect is obtained with less than 0.1 ppm. There is no reason to believe that this is the minimum effective concentration. The scale inhibitors of the present invention are effective in both brire, such as sea water, and acid solutions.

The following test is used to evaluate compounds as scale inhibitors.

Procedure

1. Make up stock $CaCl_2.2H_2O$, 2.94 gL or 56 g/5 gallons (18.9 liters).

2. Stock $NaHCO_3$ should be 3.35 g/L or 64 g/5 gallons.

3. Inhibitors—Make 0.1% solutions in deionized water. 1 ml in 100 ml sample = 10 ppm (Test at 5, 20 and 50 ppm).

Put 50 ml bicarbonate solution into 100 ml milk dilution bottle. Add inhibitor (for 100 ml final volume).

Then add 50 ml CaCl$_2$ solution and set in bath at 82° C. Do not cap. Always prepare a blank. Run a hardness determination on a 50—50 mixture before heating.

Heat at 82° C. Take 10 ml samples from bottles after two hours and four hours.

Filter through millipor filter.

Run total hardness on filtrate.

Calculate as % Ca still in solution, i.e., $$\frac{\text{Total hardness after heating}}{\text{Total hardness before heating}} \times 100 = \%$$

WATER CLARIFICATION

This aspect of the present invention relates to the use of the compounds of the invention for the clarification of water containing suspended matter, such as iron sulfide.

Water, containing ferrous ions and suspended particles which may be treated by the compounds of the present invention, may have its origin either in natural or artificial sources, including industrial and sanitary sources. Water containing suspended particles of natural origin are usually surface waters wherein the particles are suspended soil particles (silt), although subsurface waters may also be treated according to the present invention. Water having its origin in industrial process (including sanitary water) operations may contain many different varieties of suspended particles. These particles are generally the result of the particular industrial or sanitary operation concerned. Prior to discharging such industrial waste water into natural water courses it generally is desired, or required, that the suspended matter be removed.

The present invention may likewise be applied to water contained in stock or fish ponds, lakes or other natural or artificial bodies of water containing suspended solids. The compounds may be added to industrial water supplied either in preparation therefor, during or after use and prior to disposal. The compounds may be added to sanitary water supplies, either for the elimination of suspended solids prior to use or they may be added to such waters which have become contaminated with impurities from any source.

Most naturally occurring waters contain an amount of simple electrolytes (sodium, potassium, ammonium, calcium, aluminum salts) in excess of that necessary for the initial aggregation of the ultimate silt particles. This is likewise true of particles of suspended material in industrial or sanitary waters. The ultimate particles of silt or other materials are therefore naturally somewhat aggregated by reason of the presence of such electrolytes. The forces binding such ultimate particles together, however, are not great and are not such as to generally effect either rapid settling rates of the flocculated material or strong enough to prevent deflocculation.

The compounds of this invention causes rapid flocculation and also reinforce the formed aggregates of particles causing a general tightening or bonding together of the initial particles and an increasing rate of coagulation and settling, thus forming a less turbid supernatant liquid.

The addition of the compounds of this invention to the water suspension should be made in such a fashion that the resulting flocculation and aggregation of the particles takes place uniformly throughout the body of water. In order to obtain a uniform addition of the compounds of the invention to the water-borne suspension, it is generally desirable to prepare a relatively dilute stock solution of the compound and then to add such solution to the body of water. Clarification may take place either in the natural body of water or it may be caused to take place in hydraulic thickeners of known design.

The amount of the compounds of the invention to be employed will vary depending upon the amount and the degree of subdivision of the solids to be agglomerated or flocculated, the chemical nature of such solid and the particular compound employed. In general, one employs at least a sufficient amount of the compound to promote flocculation. In general, from about 0.005 to about 10,000 ppm or more, such as from about 0.5 to about 1,000 ppm, for example from about 1 to about 500 ppm, preferably from about 2 to about 5 ppm. Since the economics of these processes are important, no more than the minimum amount required for efficient removal is generally employed. It is desired, of course, to employ a sufficient amount of the compound so flocculation will take place without causing the formation of stable dispersions.

The precipitating action of the compounds of the invention can be employed in the application of loading or filling materials to textiles or paper.

The compounds of the invention will be especially useful in the processing of fine mineral particles in aqueous suspension. In the processing or ores to separate valuable mineral constituents from undesirable matrix constituents, it is frequent practice to grind the ore into a finely-divided state to facilitate separation steps such as selective flotation and the like. In many ore dressing procedures, the finely-divided ore is suspended in water to form a pulp or slime. After processing, it is usually desirable to dewater the pulp or slime either by sedimentation or filtering. In such operations, certain ores are particularly troublesome, since the finely-divided ore, when suspended in water, forms a stable slime which settles very slowly, if at all. Such slimes are unsuitable for concentration or dewatering by sedimentation and are difficult to dewater by filtration because of the tendency to clog the pores of the filter, thus leading to excessively time-consuming and inefficient operation of the filters. In some cases, for example, in certain phosphate mining operations, the formation of very stable suspensions of finely-divided mineral results not only in the loss of considerable valuable mineral as waste but also requires large expenditures for the maintenance of hold ponds for the waste. Similar problems are involved in processing gold, copper, nickel, lead, zinc, iron, taccnite ores, uranium and other ores.

Some specific additional applications for the compounds of the invention, not intended to be limiting tut merely illustrative, are listed below. The compounds can be used for the clarification of beers or wines during manufacture. Another use is in processing effluents in pharmaceutical operations for the recovery of valuable products or removal of undesirable by-products. A particularly important use is in the clarification of both beet sugar and cane sugar juices in their processing. Still another use is for flocculation and recovery of pigments from aqueous suspensions thereof. The compounds will be particularly useful in sewage treatment operations as flocculating agents. A further use is to promote, by flocculation, the removal of coal from aqueous suspensions thereof. The compositions can also be employed in the process of flocculating white water and/or recycling of the precipitate solids in the paper making process described in U.S. Pat. No. 3,393,157, and other processes described therein. In other words, the compounds of the invention are generally useful for processing aqueous effluents of all types to facilitate the removal of suspended solids.

Naturally occurring water from many sources, and in some instances, brine and brackish waters are used in the recovery of petroleum by secondary water-flooding operations. Clarification of the water is necessary in many instances prior to water flooding because the suspended impurities tend to plug the underground formations into which waters are pumped.

Example 15

A suspension of FeS in brine is subjected to the action of the water-soluble polymers prepared herein.

In this test, the FeS concentration is 25 parts per million and 1% and 5% brine solution is used. Metered quantities (500 ml) of the homogeneous suspension are placed into 1000 ml beakers and stirred at 100 rpm. The compound to be tested is injected into the suspension to give final active concentrations varying between 2 to 4 parts per million. A commercial flocculant is run simultaneously at equivalent concentrations for comparison and stirring is achieved by use of a Phipp and Bird "floc" multistirrer. After one minute the stirring rate is reduced to 20 to 30 rpm and maintained thus for ten minutes. At this time the stirring is stopped. The evaluation of the polymer starts at the moment of flocculation and continues with respect to the "floc" size and rate of precipitation. The final evaluation is achieved by examination of the color of the resultant aqueous phase.

The results obtained by employing the compounds of this invention are found to be superior to commercial flocculating agent usually employed.

USE AS BACTERIAL INHIBITORS

This aspect of the present invention relates to secondary recovery of oil by water flooding operations and is more particularly concerned with an improved process for treating brine flood water and oil recovery therewith. More particularly this invention relates to a process of inhibiting bacterial growth in the recovery of oil from oil-bearing strata by means of water flooding taking place in the presence of sulfate-reducing bacteria.

Water flooding is widely used in the petroleum industry to effect secondary recovery of oil. By employing this process the yield of oil from a given field may be increased beyond the 20-30% of the oil in a producing formation that is usually recover in the primary process. In a flooding operation, water is forced under pressure through injection wells into or under oil-bearing formations to displace the oil therefrom to adjacent producing wells. The oil-water mixture is usually pumped from the producing wells into a receiving tank where the water, separated from the oil, is siphoned off, and the oil then transferred to storage tanks. It is desirable in carrying out this process to maintain a high rate of water injection with a minimum expenditure of energy. Any impediment to the free entry of water into oil bearing formations seriously reduces the efficiency of the recovery operation.

Particularly troublesome and common to all types of water are problems directly or indirectly concerned with the presence of microorganisms, such as bacteria, fungi and algae. Microorganisms may impede the free entry of water into oil-bearing formations by producing ions susceptible of forming precipitates, forming slime and/or existing in sufficiently high numbers to constitute an appreciable mass, thereby plugging the pores of the oil-bearing formation. Free-plugging increases the pressure necessary to drive a given volume of water into an oil-bearing formation and oftentimes causes the flooding water to by-pass the formation to be flooded. In addition, microorganisms may bring about corrosion by acting on the metal structures of the wells involved, producing corrosive substances such as hydrogen sulfide, or producing conditions favorable to destructive corrosion such as decreasing the pH or producing oxygen. The products formed as the result cf corrosive action may also be pore-plugging precipitates. Usually, the difficulties encountered are a combination cf effects resulting from the activity of different microorganisrs, such as aerobic and anaerobic bacteria, including sulfate reducers.

Example 16

The compound of Example 4 was tested for efficacy using a standard laboratory screening procedure. The compounds were tested against a mixed culture of aerobic and anaerobic bacteria, including sulfate reducers.

The test medium consisted of aged artificial sea water with 0.1 gms/liter of nutrient broth added. The medium was purged with nitrogen to remove oxygen and inoculated with 10 mls/liter of a mixed culture of aerobic and anaerobic bacteria obtained from oilfield waters. Aliquots (50 ml) were dispensed into sterile, nitrogen-filled serum vials. Concentrations of the test compounds were prepared by adding the appropriate amount of a 5% solution of the compound to 50 mls of test medium. After 24 hours, exposure levels of aerobic, anaerobic and sulfate reducing bacteria were enumerated.

The results are shown in Table 3, below:

TABLE 3

| | | Surviving Bacteria/ml | | |
|---|---|---|---|---|
| Compound | Concentration (ppm) | Sulfate Reducers[a] | Anaerobes[b] | Aerobes (% killed)[c] |
| Example 4 | 800 | 10 | 10 | 99 |
| Control (Initial) | 0 | 100–1,000 | 1,000–10,000 | 1,500,000 |
| Control (24 hours) | 0 | 100–1,000 | 1,000–10,000 | 1,300,000 |

[a]Sulfate reducers enumerated by the extinction dilution technique in modified Sulfate API broth.
[b]Anaerobes enumerated by the extinction dilution technique in Difco Fluid Thioglycollate broth.
[c]Aerobes enumerated by the Standard Plate Count Procedure using Difco Plate Count Agar. All culture incubated at 35° C.

It should further be understood that the compounds of the invention may be formulated with other materials useful in the arts to which the invention pertains, thus &:he compounds may be dispersed or dissolved in appropriate diluents and solvents and may be used in conjunction with surfactants and other chemical treating agents useful for the same or different purposes, e.g., corrosion inhibitors, demulsifiers, scale and bacterial inhibitors, flocculants, water clarifiers and the like.

While the illustrative embodiments of the invention have been described with particularity, it will the understood that various other modifications will be apparent to and can be readily made by those skilled in the art without departing from the spirit and scope of the invention. Accordingly, it is not intended that the scope of the claims appended hereto be limited to the examples and descriptions set forth herein but rather that the claims be construed as encompassing all the features of patentable novelty which reside in the present invention, including all features which would be treated as equivalents thereof by those skilled in the art to which the invention pertains.

What is claimed is:

1. A method of water clarification by flocculation of suspended solids from an aqueous effluent and the removal of the flocculated solids to produce clarified water comprising adding to said aqueous effluent an effective flocculating amount of a compound having the formula

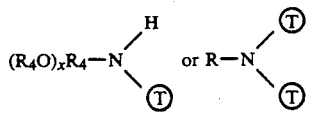

wherein ⊤ is hydrogen, C(=S) SR$_2$,

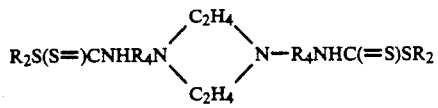

with the proviso that at least two ⊤s are C(=S)SR$_2$; R is an alkylene having 2-30 carbon atoms; R$_1$ is hydrogen or an alkyl having 1-30 carbon atoms; R$_2$ is an alkali metal, an alkaline earth metal, or N(R$_3$)$_4$ where R$_3$ is a lower alkyl; R$_4$ is C$_2$-C$_4$ alkylene; x is an integer of 3-200; and n is an integer of 1-10 and removing the resulting flocculated solids from the effluent.

2. The method of claim 1 wherein R is ethylene or propylene, R$_1$ is hydrogen and n is 1-5.

3. The method of claim 2 wherein R$_2$ is sodium or potassium.

4. The method of claim 1 wherein R is ethylene, R$_1$ is hydrogen and n is 4.

5. The method of claim 4 wherein R$_2$ is sodium.

6. The method of claim 1 wherein R is hexamethylene, R$_1$ is hydrogen and n is 1-5.

7. The method of claim 6 wherein R$_2$ is sodium and n is 2.

8. The method of claim 1 wherein R is ethylene, R$_1$ is hydrogen and n is 2.

9. The method of claim 8 wherein R$_2$ is sodium.

10. The method of claim 1 wherein R is propylene, R$_1$ is octyl and n is 1.

11. The method of claim 10 wherein R$_2$ is sodium.

12. The method of claim 1 wherein R is ethylene, R$_1$ is hydrogen and n is 1.

13. A method of water clarification by flocculation of suspended solids from an aqueous effluent and the removal of the flocculated solids to produce clarified water comprising adding said aqueous effluent an effective flocculating amount of a compound having the formula R[NHC(=S)SR$_2$]n wherein R is a divalent, trivalent or tetravalent saturated hydrocarbon radical; n is an integer corresponding to the valence of R; R$_2$ is an alkali metal, an alkaline earth metal or N(R$_3$)$_4$ where R$_3$ is a lower alkyl and removing the resulting flocculated solids from the effluent.

14. The method of claim 13 wherein R$_2$ is sodium or potassium.

15. A method of water clarification by flocculation of suspended solids from an aqueous effluent and the removal of the flocculated solids to produce clarified water comprising adding to said aqueous effluent an effective flocculating amount of a compound having the formula $$R_2S(S=)CNHR_4N\diagdown_{C_2H_4}^{C_2H_4}\diagup N-R_4NHC(=S)SR_2$$

wherein R$_4$ is an alkylene having 2-30 carbon atoms and R$_2$ is an alkali metal, alkaline earth metal or N(R$_3$)$_4$ where R$_3$ is a lower alkyl and removing the resulting flocculated solids from the effluent.

16. The method of claim 15 wherein R$_4$ has 2-6 carbon atoms.

17. The method of claim 15 wherein R$_4$ is propylene or ethylene.

18. The method of claim 17 wherein R$_2$ is sodium or potassium.

19. The method of claim 18 wherein R$_4$ is ethylene.

20. A method of water clarification by flocculation of suspended solids from an aqueous effluent and the removal of the flocculated solids to produce clarified water comprising adding to said aqueous effluent an effective flocculating amount of a compound having the formula

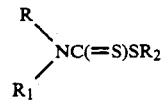

wherein R and R$_1$ are hydrogen, alkyls or cyclic hydrocarbons having 1-30 carbon atoms with the proviso that only one of R and R$_1$ may be hydrogen; and R$_2$ is an alkali metal, alkaline earth metal or N(R$_3$)$_4$ where R$_3$ is a lower alkyl and removing the resulting flocculated solids from the effluent.

21. The method of claim 20 wherein R is butyl.

22. The method of claim 21 wherein R$_2$ is sodium or potassium.

23. A method of flocculation and removal of suspended solids from an aqueous effluent comprising adding to said aqueous effluent an effective flocculating amount of a compound having the formula R[(OR$_1$)$_x$—NH—C(=S)SR$_2$]$_n$ wherein R is a divalent, trivalent or tetravalent saturated hydrocarbon radical; R$_1$ is a C$_2$-C$_4$ alkylene; x is an integer of 1-30; n is an integer corresponding to the valence of R; R$_2$ is an alkali metal, alkaline earth metal or N(R$_3$)$_4$ where R$_3$ is a lower alkyl and removing the resulting flocculated solids from the effluent.

24. The method of claim 23 wherein R is a hydrocarbon radical having 1 to 30 carbon atoms.

25. The method of claim 24 wherein n is three.

26. The method of claim 25 wherein R$_2$ is sodium or potassium.

* * * * *

REEXAMINATION CERTIFICATE (1892nd)

United States Patent [19]

Thompson et al.

[11] B1 5,019,274

[45] Certificate Issued  Dec. 29, 1992

[54] METHODS FOR TREATING HYDROCARBON RECOVERY OPERATIONS AND INDUSTRIAL WATERS

[75] Inventors: Neil E. S. Thompson, Creve Coeur; Robert G. Asperger, Des Peres, both of Mo.

[73] Assignee: Petrolite Corporation, St. Louis, Mo.

Reexamination Request:
No. 90/002,539, Dec. 6, 1991

Reexamination Certificate for:
Patent No.:  5,019,274
Issued:  May 28, 1991
Appl. No.:  374,900
Filed:  Jun. 30, 1989

Related U.S. Application Data

[63] Continuation-in-part of Ser. No. 208,627, Jun. 20, 1988, Pat. No. 4,864,075, which is a continuation-in-part of Ser. No. 7,701, Jan. 28, 1987, abandoned, which is a continuation-in-part of Ser. No. 645,740, Aug. 30, 1984, abandoned.

[51] Int. Cl.$^5$ .............................. C02F 1/54
[52] U.S. Cl. ...................... 210/729; 209/5; 210/735

[56]  References Cited

U.S. PATENT DOCUMENTS

| | | | |
|---|---|---|---|
| 2,589,209 | 3/1952 | Kardos | 260/72 |
| 3,507,787 | 4/1970 | Pratt et al. | 210/54 |
| 3,929,635 | 12/1975 | Buriks et al. | 210/54 |
| 4,179,549 | 12/1979 | Buriks et al. | 525/374 |
| 4,224,150 | 9/1980 | Buriks et al. | 210/735 |
| 4,230,839 | 10/1980 | Buriks et al. | 526/75 |
| 4,310,472 | 1/1982 | Buriks et al. | 260/465.4 |
| 4,341,887 | 7/1982 | Buriks et al. | 526/263 |

FOREIGN PATENT DOCUMENTS 771181 11/1967 Canada .......................... 260/455

OTHER PUBLICATIONS

A. M. Gaudin, *Flotation*, McGraw-Hill, New York, 1957, pp. 123, 182, 209-210.
*Chemical Technology: An Encyclopedic Treatment*, Barnes & Nobel, New York, 1968, pp. 14-16, 115-117.
Mineral Resources Research Center, *Flocculation and Clarification of Mineral Suspensions*, May 1971, p.v.
S. Gutcho, *Waste Treatment with Pllyelectrolytes and Other Flocculants*, Noyes Data Corp., Park Ridge, NJ, 1977, pp. vii-xi, 81, 86-88.
P. Somasundaran, "Foams and Flotation: A Critique," *Theory, Practice and Process Principles of Physical Separations: Proceedings of the Engineering Foundation Conference*, Oct. 30-Nov. 4, 1977, Engineering Foundation, New York, 1981, pp. 237-242.
B. Yarar, et al., "Flocculant-Aided Water Clarification in a Copper Flotation Plant," *Filtration & Separation*, Nov./Dec. 1977, pp. 664-667.

*Primary Examiner*—Peter A. Hruskoci

[57] ABSTRACT

Certain dithiocarbamates are used as reverse demulsifiers, corrosion and scale inhibitors, flocculants, biocides, flotation aids, water clarifiers, interface control agents and antifoaming agents.

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-26 is confirmed.

* * * * *

REEXAMINATION CERTIFICATE (1892nd)
United States Patent [19]
Thompson et al.

[11] B1 5,019,274
[45] Certificate Issued Dec. 29, 1992

[54] METHODS FOR TREATING HYDROCARBON RECOVERY OPERATIONS AND INDUSTRIAL WATERS

[75] Inventors: Neil E. S. Thompson, Creve Coeur; Robert G. Asperger, Des Peres, both of Mo.

[73] Assignee: Petrolite Corporation, St. Louis, Mo.

Reexamination Request:
No. 90/002,539, Dec. 6, 1991

Reexamination Certificate for:
Patent No.: 5,019,274
Issued: May 28, 1991
Appl. No.: 374,900
Filed: Jun. 30, 1989

Related U.S. Application Data

[63] Continuation-in-part of Ser. No. 208,627, Jun. 20, 1988, Pat. No. 4,864,075, which is a continuation-in-part of Ser. No. 7,701, Jan. 28, 1987, abandoned, which is a continuation-in-part of Ser. No. 645,740, Aug. 30, 1984, abandoned.

[51] Int. Cl.$^5$ .................................. C02F 1/54
[52] U.S. Cl. ........................ 210/729; 209/5; 210/735

[56] References Cited

U.S. PATENT DOCUMENTS

| | | | |
|---|---|---|---|
| 2,589,209 | 3/1952 | Kardos | 260/72 |
| 3,507,787 | 4/1970 | Pratt et al. | 210/54 |
| 3,929,635 | 12/1975 | Buriks et al. | 210/54 |
| 4,179,549 | 12/1979 | Buriks et al. | 525/374 |
| 4,224,150 | 9/1980 | Buriks et al. | 210/735 |
| 4,230,839 | 10/1980 | Buriks et al. | 526/75 |
| 4,310,472 | 1/1982 | Buriks et al. | 260/465.4 |
| 4,341,887 | 7/1982 | Buriks et al. | 526/263 |

FOREIGN PATENT DOCUMENTS 771181 11/1967 Canada .................. 260/455

OTHER PUBLICATIONS

A. M. Gaudin, *Flotation*, McGraw-Hill, New York, 1957, pp. 123, 182, 209–210.
*Chemical Technology: An Encyclopedic Treatment*, Barnes & Nobel, New York, 1968, pp. 14–16, 115–117.
Mineral Resources Research Center, *Flocculation and Clarification of Mineral Suspensions*, May 1971, p.v.
S. Gutcho, *Waste Treatment with Pllyelectrolytes and Other Flocculants*, Noyes Data Corp., Park Ridge, NJ, 1977, pp. vii–xi, 81, 86–88.
P. Somasundaran, "Foams and Flotation: A Critique," *Theory, Practice and Process Principles of Physical Separations: Proceedings of the Engineering Foundation Conference*, Oct. 30–Nov. 4, 1977, Engineering Foundation, New York, 1981, pp. 237–242.
B. Yarar, et al., "Flocculant-Aided Water Clarification in a Copper Flotation Plant," *Filtration & Separation*, Nov./Dec. 1977, pp. 664–667.

*Primary Examiner*—Peter A. Hruskoci

[57] ABSTRACT

Certain dithiocarbamates are used as reverse demulsifiers, corrosion and scale inhibitors, flocculants, biocides, flotation aids, water clarifiers, interface control agents and antifoaming agents.

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-26 is confirmed.

* * * * *